Oct. 8, 1963    J. H. WILSON    3,106,023
MAGNETICALLY ATTACHABLE MICROMETER UNIT
Filed May 5, 1960
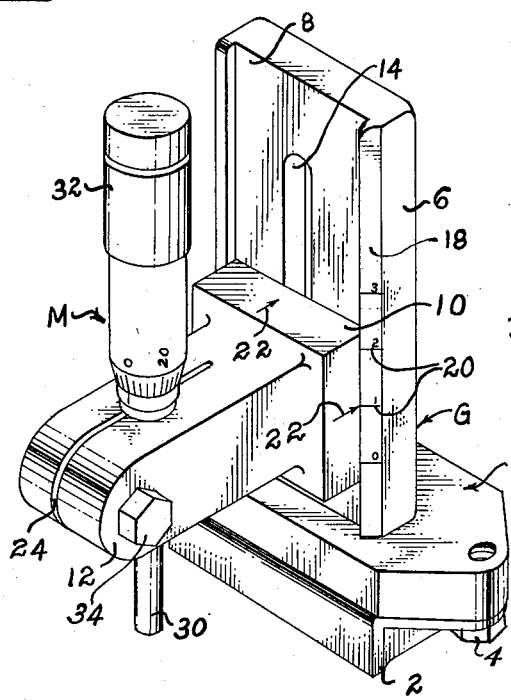
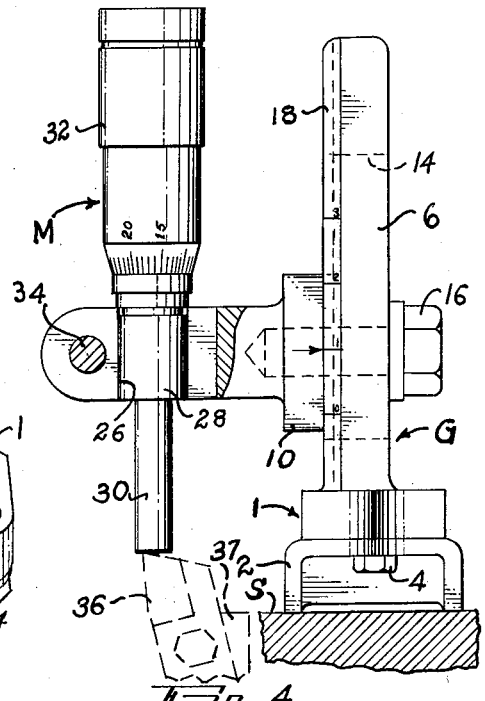
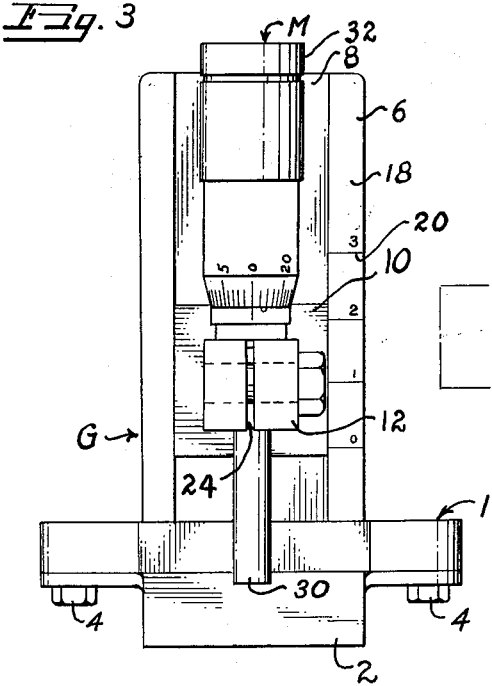
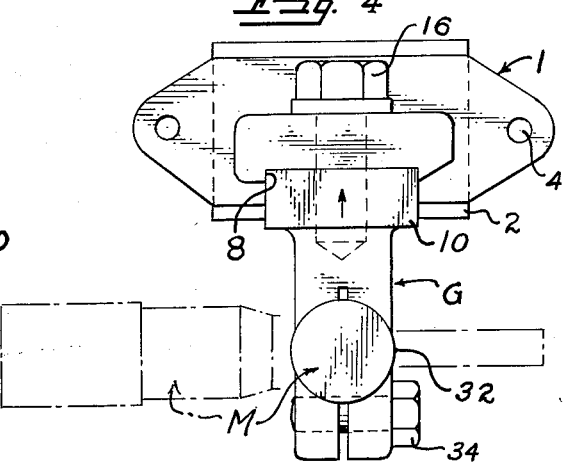
JOHN HART WILSON
INVENTOR.
BY
Wayland D. Keith
HIS AGENT

United States Patent Office 3,106,023
Patented Oct. 8, 1963

3,106,023
MAGNETICALLY ATTACHABLE MICROMETER UNIT
John Hart Wilson, % Wilson Manufacturing Co., Box 1031, Wichita Falls, Tex.
Filed May 5, 1960, Ser. No. 27,052
1 Claim. (Cl. 33—170)

This invention relates to a magnetically attachable micrometer mounting which may be readily attached to the surface of any ferrous material or magnetically compatible material, and which will be maintained attached thereto by magnetic attraction, so a micrometer instrument may be secured thereto, to enable measurements to be made with respect to an adjacent surface thereof.

The present device is particularly adaptable for use on machine tools and the like for determining the accurate settings of tool bits and cutters in boring bars, and the like; however, the device is readily adaptable to other fields of endeavor to determine readings from relatively inaccessible places.

Various gauging devices have been proposed heretofore, such as dial gauges and the like, to determine unevenness of a surface. The present device, however, is so constructed that it may be magnetically attached to a surface and the spindle of a micrometer instrument set at a given setting, and a tool bit or the like brought into contact with the face of the spindle of the micrometer instrument so as to give an accurate reading without the necessity of using parallel bars, gauge blocks, or various other accessories to determine the reading desired.

An object of this invention is to provide a micrometer unit which is readily attachable to the surface of a ferrous or magnetically compatible piece of material.

A still further object of the invention is to provide a micrometer unit, the base of which is magnetically attachable to the surface of a ferrous or magnetically compatible material, and wherein the micrometer may be rotated to extend outward from the standard thereof at each ninety degree quadrant.

Still another object of the invention is to provide a magnetically attachable micrometer unit which is simple in construction, easy to adjust and which may be made to sell at a relatively low cost.

With these objects in mind and others which will become manifest as the description proceeds, reference is to be had to the accompanying drawings in which like reference characters designate like parts in the several views thereof, in which:

FIG. 1 is a perspective view of the present device taken from the top and showing two adjacent sides thereof;

FIG. 2 is a side elevational view of the device attached to the surface of a piece of ferrous material, with parts broken away and with parts shown in section, and with other parts shown in dashed outline to illustrate the manner of use;

FIG. 3 is a front elevational view of the device; and

FIG. 4 is a top plan view of the device, showing an alternate position of the micrometer barrel and spindle in dot-dash outline.

With more detailed reference to the drawing the numeral 1 designates generally a base to which a magnet 2 is attachably secured by means of cap screws 4. It is preferable that the magnet 2 be of the alloyed type, such as Alinco, or other suitable magnet material having a high magnetic pull. The base 1 has a standard 6 which extends upward therefrom, which standard preferably has a smoothly machined channel 8 in one side thereof to complementally receive a squared base 10 of an outstanding bracket 12. The upstanding standard 6 has an elongated slot 14 positioned longitudinally therein intermediate the channel portion 8. A cap screw 16 is adapted to pass through the slot 14 to threadably engage the base 10 of outstanding bracket 12, to enable the bracket 12 to be adjustably secured to the upstanding standard 6 at any desired point along the length thereof. An edge of the upstanding standard 6 may be beveled, as indicated at 18, to receive calibrations and indicia 20 along the face thereof.

The base 10 has calibration marks, such as arrows 22, one on each of the four sides thereof, which calibration marks 22 are adapted to register with the several calibrated marks 20 on the bevel face 18 of the upstanding standard 6 to enable the base 10 to be "set" at approximately the desired place along standard 6, however, for a setting of exacting accuracy, it is preferable to use gauge blocks.

The bracket 12 is bifurcated, as indicated at 24, which bifurcation is adapted to intersect a bore 26 within bracket 12. The bore 26 is adapted to receive a micrometer barrel 28 therein, with a spindle 30 extending outward from an end thereof, and with the rotatable thimble 32 thereof extending outward from the opposite end of barrel 28, which thimble 32 is adapted to move the spindle in and out of the barrel 28, which barrel is fixed against rotation by clamping the bifurcated portions 24 of bracket 12 together by means of a threaded cap screw 34 which passes transversely through the bracket 12 and the bifurcated portion 24 and is screw threaded into the portion of the bracket 12 opposite the head of cap screw 34.

It is to be pointed out that the bracket 12 may be adjusted longitudinally along standard 6, with the arrow 22 being brought to an appropriate setting, gauge blocks are then used to obtain a setting within the desired tolerance.

Therefore, by noting the setting of bracket 12, the bracket may be reset to approximately the same setting, even though the base 10 has been moved longitudinally along standard 6 within channel 8. Furthermore, with the base 10 being square, and with an arrow 22 on each of the four sides thereof, the micrometer spindle can be turned at right angles to the position as shown in FIG. 1, or if desired, the base 10 may be turned through 180 degrees from the position shown in FIG. 1, and the arrow 22 brought into register with indicia on the bevel face 18 of standard 6.

The standard 6 is shown to be relatively short, but it is to be understood that the height of the standard may be varied to meet the conditions of the particular work to be performed. The length of the slot 14 may be varied according to the height of standard 6, to enable the raising and lowering of bracket 12 on the standard 6, thereby greatly increasing the range in which the micrometer will work.

In the various industries which use machine tools, such as turret lathes, automatics, and various other type lathes, the tool bits thereof, such as tool bit 36, may be adjusted with respect to the tool holder 37 by magnetically attaching the gauge, designated generally at G, to the surface of some ferrous material and setting the bracket 12 on the standard 6 to a suitable height, with the end of the micrometer spindle touching the cutting point of the tool.

*Setting Operation*

In the operation of the tool, setting gauge G can be used to set a cutting tool 36 in two ways. The first might be called "trial and correction" method, in which the tool 36 is set to approximately the size it is desired to cut, but slightly under size if it is a bore, or oversize if it is an outside diameter. Then a short cut is made and the diameter accurately measured. The tool setting gauge G is then placed upon the "magnet engaging surface S" and an accurate reading of the micrometer M to the cutting point of the tool is made and recorded. Then the difference between the actual size produced and the desired size is divided by two and the micrometer tool setting gauge spindle 30 is moved by this amount. The cutting tool is then loosened in the holder and moved out until it is in contact with the end of the spindle 30 of the micrometer in this new position and clamped in place in this position. If carefully done, this should produce the desired size without further adjustment, if by reason of the spring in the tool 36, or in the machine, the size is still not correct, the same procedure can be repeated until the correct size is obtained.

For setting gauge G on lathes or other rotating spindle machines, the magnet engaging surface S should be at a right angle to the radial line from the point of the tool 36 to the center of the work, or to the center of the bar, if a boring bar is being used.

The second method consists in determining, by any suitable means, the accurate distance from the "magnet engaging surface S" to the center of the work spindle of the machine. When this has been determined, it is a relatively simple calculation to determine the distance from the "magnet engaging surface S" to the point of the tool 36 to produce the desired diameter. When this measurement has been determined, the tool setting gauge is placed upon any suitable flat surface S and a gauge block (not shown) of known thickness placed under the micrometer spindle 30 and the spindle moved until it just touches the gauge block. Then the spindle can be moved a distance so that the sum of the gauge block thickness and the change in the micrometer reading is equal to the calculated distance from the "magnet engaging surface S" to the center of the spindle. By using this method, if carefully applied, the tool 36 can be set to the correct diameter the first time.

If the machine is in use and the cutting tool 36 becomes dull, producing an oversize or an undersize diameter, the tool setting gauge G can be placed on the "magnet engaging surface S" and the distance to the point of the dull tool 36 measured. Then if the work is under or over size, the micrometer spindle 30 can be moved half the distance of the over or undersize, respectively, then a new sharp tool 36 may be clamped in position with the cutting edge of the tool against the end of the micrometer spindle 30, in the new position. If this is properly done, the tool 36 should then produce the correct size on the first cut. If the setting is not properly done, it can be reset as described in the previous paragraph.

While a relatively small unit has been disclosed in the accompanying drawing, it is to be understood that standard 6, as well as the outstanding bracket 12, may be varied in length to meet individual requirements, and also that the micrometer unit M may be of such character as to accommodate the particular type work to be done.

It is preferable to have the base 1, standard 6 and the bracket 12 of non-magnetic material, with the channel 8 of the standard 6 being machined and polished to complementally receive squared base 10, the sides of which, as well as the interfitting face portion of the base 10, are also machined and polished so as to enable the base 10 and the upstanding standard 6 to be fitted together with close tolerances so that accurate readings may be obtained from the device.

The micrometer assembly M comprises the spindle 30, sleeve 28 and thimble 32 which form the measuring unit, which unit is attachably secured to bracket 12 to perform the measuring functions of the micrometer unit G, which micrometer unit G also includes base 1 and upstanding standard 6 to which the bracket 12 is attached.

Having thus clearly shown and described the invention, what is claimed as new and desired to be secured by Letters Patent is:

A magnetically attachable micrometer unit comprising:
(a) a magnet forming a base,
(b) a standard extending outward from said magnet,
(1) said standard having a relatively smooth, shallow channel formed in a face side thereof,
(c) a bracket,
(1) said bracket having a base wherein the four side dimensions of said base are equal and which are adapted to be received in close, complementary relation in said shallow channel in said standard,
(2) said bracket being adapted to be moved longitudinally of said standard in true guided relation in said shallow channel, said standard having an elongated slot formed therein which extends therethrough and which is in communication with said shallow channel,
(3) the inner face of said base of said bracket having a screw threaded hole formed centrally therein,
(4) said screw threaded hole in said base being adapted to register with said elongated slot in said standard when said base is fitted in said channel in any of four positions,
(d) a screw threaded bolt adapted to pass through said slot in said standard and to threadably engage said base of said bracket to hold said bracket in fixed relation to said standard,
(1) said bracket having a bore formed therethrough,
(2) which bore is parallel with the longitudinal axis of said standard when in one position,
(e) a micrometer sleeve fixedly secured within said bore of said bracket,
(1) which micrometer sleeve has a spindle extending outward from an end thereof, and
(f) adjustment means on said micrometer sleeve for moving said spindle longitudinally relative to said bracket.

References Cited in the file of this patent
UNITED STATES PATENTS

| | | |
|---|---|---|
| 1,788,481 | Boucher | Oct. 14, 1930 |
| 1,803,311 | Bishop | May 5, 1931 |
| 1,887,437 | Schotthoefer | Nov. 8, 1932 |
| 2,137,484 | Graham | Nov. 22, 1938 |